United States Patent [19]

Arumainayagam et al.

[11] Patent Number: 5,493,607
[45] Date of Patent: Feb. 20, 1996

[54] MULTI-SYSTEM NETWORK ADDRESSING

[75] Inventors: Allen T. Arumainayagam, Malden, Mass.; José Capó, Pelham, N.H.; Robert F. Penfield, Maynard; Anthony N. Deigh, Groton, both of Mass.

[73] Assignee: Boston Technology, Wakefield, Mass.

[21] Appl. No.: 871,770

[22] Filed: Apr. 21, 1992

[51] Int. Cl.⁶ ........................................................ H04M 1/64
[52] U.S. Cl. .................. 379/88; 379/94; 379/207; 379/269; 395/600; 364/DIG. 1
[58] Field of Search ................ 379/88, 89, 94, 379/207, 269, 142; 370/60, 60.1, 61; 395/600

[56] References Cited

U.S. PATENT DOCUMENTS

| | | | |
|---|---|---|---|
| 4,287,592 | 9/1981 | Paulish et al. | 370/92 |
| 4,585,906 | 4/1986 | Matthews | 379/88 |
| 4,602,129 | 7/1986 | Matthews | 379/88 |
| 4,790,003 | 12/1988 | Kepley et al. | 379/88 |
| 4,918,588 | 4/1990 | Barrett et al. | 395/600 |
| 4,933,967 | 6/1990 | Lo et al. | 379/89 |
| 5,029,199 | 7/1991 | Jones et al. | 379/89 |
| 5,146,590 | 9/1992 | Lorie et al. | 395/600 |
| 5,193,110 | 3/1993 | Jones et al. | 379/89 |
| 5,247,658 | 9/1993 | Barrett et al. | 395/600 |

FOREIGN PATENT DOCUMENTS 0295904A 12/1988 European Pat. Off. .
0507125A2 10/1992 European Pat. Off. .

OTHER PUBLICATIONS

Text Search and Retrieval Training Manual for the Automated Patent System. May 17, 1991, pp. 3–1 to 3–17.
ACCESS Net Administration 801–1301–00 Issue 1, Oct. 1989.

*Primary Examiner*—Jeffery A. Hofsass
*Assistant Examiner*—Fan Tsang
*Attorney, Agent, or Firm*—Staas & Halsey

[57] ABSTRACT

Storage locations, such as voice mailboxes are addressed on a plurality of widely distributed host systems, connect via a network, by defining logical domains Bach of which may include storage locations on more than one host system. The domains are defined by address tables which indicate which host systems provide ranges of address locations. Transfer of data between domains is simplified by the use of translation tables. One type of translation table is an alias table which has entries containing a range in the originating domain, a new domain and a starting point for a range in the new domain, thus defining a one-to-one correspondence between the ranges in the two domains. Another translation table is a gateway table which defines a gateway to a new domain when an input address has characteristics matching a prefix, number of digits, or both, of an entry in the gateway table. Upon finding the closest possible match in the gateway table, the portion of the input address after the prefix, if any, is used as the address in the new domain.

11 Claims, 4 Drawing Sheets

MULTI-SYSTEM NETWORK ADDRESSING

CROSS-REFERENCE TO RELATED APPLICATION

This application is related to VOICEMAIL NETWORK AND NETWORKING SYSTEM by Allen Arumainayagam et al., application Ser. No. 07/871,417, now abandoned filed concurrently herewith and assigned to the assignee of this application, which is hereby incorporated by reference.

BACKGROUND OF THE INVENTION

1. Field of the Invention

The present invention is directed to addressing in a network formed by a plurality of data processing systems and, more particularly, to an addressing system for voice mailboxes provided by telephone systems throughout the world.

2. Description of the Related Art

In recent years, telephone companies, particularly in North America, have begun providing a number of information services to subscribers. A common service is to store and forward voice mail messages. Examples of systems which enable public telephone companies to provide such services are disclosed in U.S. Pat. Nos. 4,371,752; 4,580,012; 4,581,486; 4,585,906; and 4,602,129, all assigned to VMX, Inc. (U.S. Pat. No. 4,371,752 was originally assigned to ECS Telecommunications, Inc.). Other systems are described in U.S. Pat. No. 5,029,199 and U.S. patent application Ser. No. 07/594,648 which are assigned to Boston Technology, Inc. and are incorporated herein by reference. These systems are connected to a central office of a local telephone company or to a private branch exchange or other system handling calls for a large number of telephones. When one of the telephones serviced by the central office or other system is not answered, the calling party is given an opportunity to leave a telephone message which is stored for later reproduction by the user of the called telephone. The mailbox owner is given the ability to reproduce, store or dispose of the message. One of the ways in which a message may be disposed is to forward the message to another user.

Several of these systems may be connected at various nodes in a telephone network. The nodes may be all within a single local telephone company, or in several different local telephone companies, such as those within one or more of the regional Bell companies. At the present time, a user may forward a message to another user on the same data processing system, i.e., at the same node, but no method currently exists for easily transferring messages from a user on one data processing system to a user having a voice mailbox on another data processing system at a different node of the telephone system.

SUMMARY

An object of the present invention is to provide a method for addressing storage locations throughout a widely distributed data processing network.

Another object of the present invention is to provide a method for easily transferring voicemail messages from one data processing system to another data processing system via a telephone network.

The above objects are attained by providing a method of addressing in a distributed data processing system having storage units and processors, comprising the steps of: defining domains of storage locations in the storage units without requiring any physical relationship between the domains and the storage units containing the storage locations; storing at least one translation table to identify the domains for input addresses; and identifying a storage location for each of the input addresses by determining an addressed domain and then the addressed location within the addressed domain. The invention is of particular use in a widely distributed data processing network in which local data processing systems are connected via a telephone network and handle processing of services for telephone subscribers. For example, the storage locations may be voice mailboxes which exist on data processing systems connected to several modes of one or more telephone networks.

According to the present invention the voice mailboxes are organized by domains of users. Each domain is a logical organization defining a group of subscribers which typically will be expected to communicate to one another fairly often, such as a single company, a social organization (e.g., a Lions Club) or other group of individuals. Since the users within a domain may be physically separated, as well as for other reasons involving how information services equipment is added to the telephone system, it is desirable to permit a single domain to include voice mailboxes on more than one data processing system. This is accomplished by defining unique names for each domain anywhere in the world and then defining how a user in one domain can communicate with any of the users in another domain. This definition of communication method may use an alias table in which one number gets converted to another number in a different domain, or a gateway table in which the prefix of a number or the number of digits in a number, or both tables, to translate a number entered in one domain into a number identifying a voice mailbox in another domain.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

In existing telephone networks, dialing a series of digits on one communication device, such as a telephone or facsimile machine, identifies another communication device at a specific physical location. The digits dialed inform the telephone network of the physical location of the called device and switches in the network connect the calling device to that physical location. The network used may be the public telephone network, largely provided by local Bell operating companies in the United States, or a private network or a leased line direct from one location to another location of a single large corporation.

Newer information services which are being made available by telephone companies do not require the same physical relationships as conventional telephone devices. For example, a voicemail subscriber may have a voice mailbox provided by a data processing system hundreds or thousands of meters from the telephone whose calls are routed to that voice mailbox. Furthermore, the subscriber may be able to access that mailbox from any telephone, not only the telephone whose calls are routed to that voice mailbox.

As the number of subscribers to services, such as voicemail, increase, an efficient widely distributed network of data processing systems is highly desirable. To enable a plurality of widely distributed data processing systems to provide information services, transfer of data from one system to another generally requires the actual transfer of the data. Furthermore, efficient use of resources may mean that two telephones sitting on adjacent desks may have voice mailboxes associated therewith provided by data processing systems which may be several kilometers apart and several kilometers from the telephones. Presumably, the adjacent telephones have a logical relationship, that is, the owner of the telephones is a company which may have 100 or more telephones nearby the two adjacent telephones and hundreds or thousands more at other sites. The voice mailboxes associated with all of these telephones thus have a logical relationship, i.e., they are subscribed for by the same company. According to the present invention, this logical relationship is termed a domain or logical domain.

Figure 1:
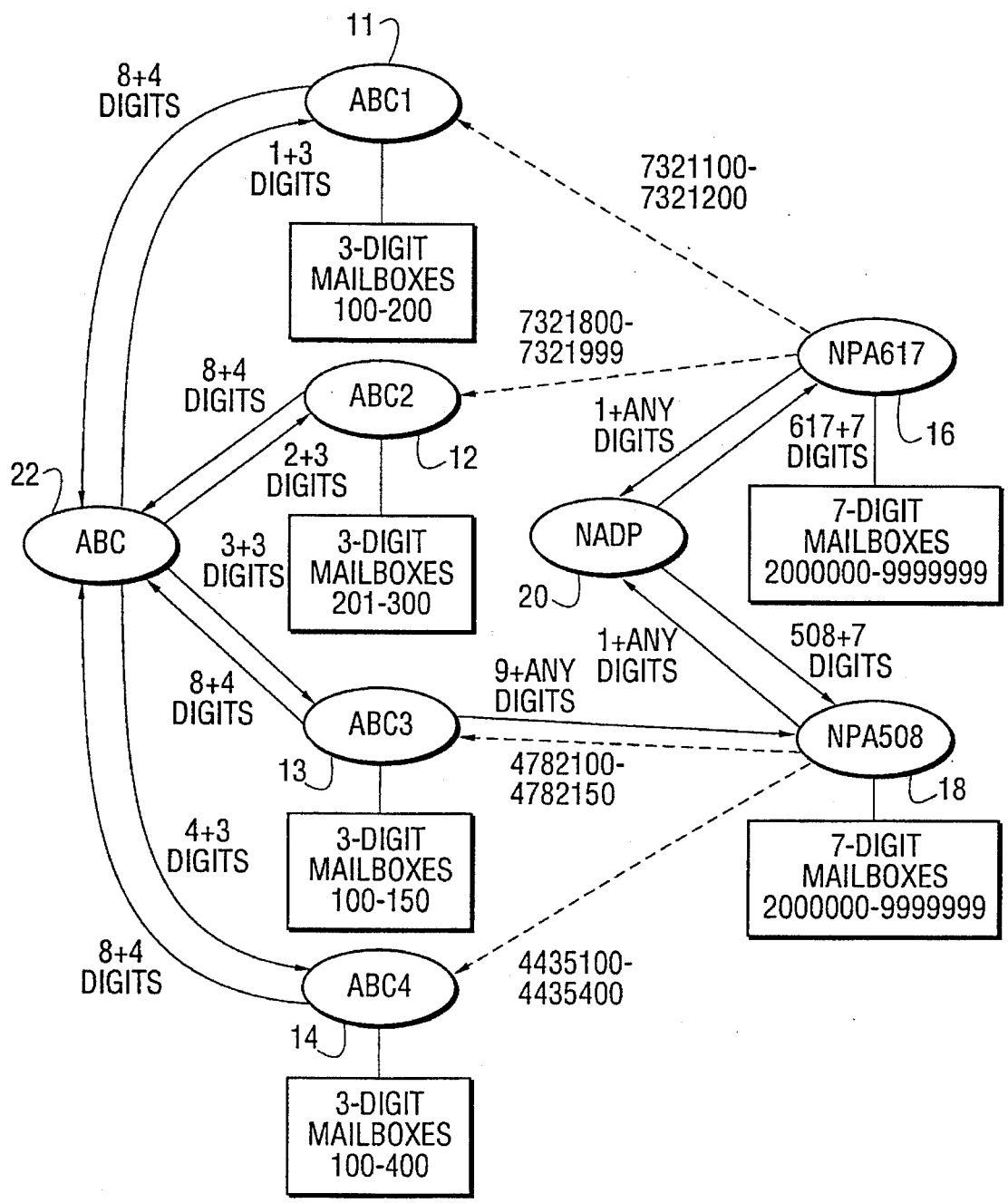
FIG. 1 is a block diagram of domains used for addressing according to the present invention.

As an example, FIG. 1 depicts the domains of mailboxes of the ABC company with less than a thousand voice mailboxes in four logical domains 11–14. Other logical domains in FIG. 1 are represented by ovals 16, 18 for voice mailboxes assigned to telephone numbers in numbering plan area (NPA) codes 617 and 508, respectively. The NPA domains 16 and 18 serve as parent domains for the ABC domains 11–14. An oval 20 representing a North American dialing plan (NADP) routing domain provides a central place to define relationships to all area code domains, but does not include any voice mail boxes. Similarly, oval 22 represents a routing domain for the entire ABC company which enables voice mail messages to be sent from, e.g., the ABC1 domain 11 to the ABC4 domain 14 by outdialling "84nnn" where "nnn" represent any number in the range 100–400. In a similar manner, a subscriber in the NPA508 domain 18 uses the NADP routing domain 20. Further explanation of how voice mail messages are handled using logical domains will be provided below.

Voice mailboxes and other types of storage locations of course have a physical manifestation in addition to the logical relationships illustrated in FIG. 1. In the case of voice mailboxes, the voice data or messages must actually be stored in some physical device. The type of device will depend upon the type of data processing system being used, and will be referred to as simply a storage unit. As known in the art, the storage unit may be provided by magnetic disks, optical data storage, etc. The storage units are connected to data processing systems which will be referred to as host systems, or simply "hosts". A relationship between the logical storage locations and the physical devices providing storage for those locations is defined according to the present invention in an address table. One example of an storage table is provided below for a portion of the NPA617 domain 16. A range of address locations having a scope, or number of locations, of at least one, is defined by the first two columns of the address table. The third column contains a host identifier of the host system providing physical storage for the storage locations or voice mailboxes within the range. Alternative ways of defining the address table include using a starting point of a range and length of the range and any other known method of identifying storage locations provided by a host system.

ADDRESS TABLE

| Start of Range | End of Range | Host Name | Network Account |
|---|---|---|---|
| 2210000 | 2219999 | WALTHAM | |
| 2230000 | 2275999 | BOSTON1 | XYZ Co. |
| 2290000 | 2299999 | WALTHAM | |
| 2310000 | 2319999 | WAKEFIELD | |
| 2320000 | 2329999 | BOSTON2 | |
| 2330000 | 2339999 | WAKEFIELD | |
| 2360000 | 2369999 | BOSTON1 | |
| 2370000 | 2399999 | BOSTON2 | XYZ Co. |
| 2410000 | 2449999 | BOSTON3 | |
| 2450000 | 2469999 | WAKEFIELD | |

The network account column is used as described in the copending application entitled VOICE MAIL NETWORK AND NETWORKING SYSTEM to indicate that the mailboxes within the specified range are associated with a different account than the default network account for the NPA617 domain 16. Two entries are shown with a network account for XYZ Company which, unlike the ABC Company, has not had its own domain assigned. The address tables for the ABC domains 11–14 may use the network account field to separate voice mailboxes within a domain into different accounts based on administrative divisions within the company. As indicated in the address table above, the NPA617 domain 16 has storage locations on at least five different host systems and if the XYZ Company was defined as a logical domain, instead of only a network account, even this small domain would have storage locations provided by two different host systems.

When a voice mail message is sent from one voice mailbox to another voice mailbox within a single domain or transfer is made from other types of application accounts, such as automated attendant accounts, it is only necessary to provide the name of the destination voice mailbox within that domain. For example, in the domains illustrated in FIG. 1, the ABC3 domain 13 has voice mailboxes with three digit names. If a user with a voice mailbox in the ABC3 domain 13 wishes to send a voicemail message to another user in the same domain, the three digit name of the destination mailbox is entered at an appropriate time in response to a prompt provided by the host system. Due to the naming conventions and translation tables provided according to the present invention, it is also possible to easily address an account or mailbox in another domain.

Two types of translation tables are provided in the preferred embodiment for the purpose of accessing other domains. The first is a gateway table. An example of the gateway table in the ABC3 domain 13 is provided below. In a gateway table, there are two fields indicating when access is to be made to another domain. The first field identifies a prefix or initial part of an address. The second field indicates a minimum number of digits identifying another domain. These two fields may be used individually or in combination.

| GATEWAY TABLE FOR ABC3 | | |
|---|---|---|
| Prefix | # digits | Domain |
| 8 | 4 | ABC |
| 9 | 7 | NPA508 |

The first entry in the gateway table example above provides access from the ABC3 domain 13 to the ABC routing domain 22. When the prefix "8" is detected and at least four additional digits are received, further processing is performed in the ABC routing domain 22. The second digit (the digit following the "8") identifies one of the ABC domains 11–14 and the remaining three digits are used as the voice mailbox name in the identified ABC domain. A prefix alone may be sufficient to identify a new domain, in which case the number of digits field would be "1".

The number of digits field alone can also indicate access to another domain. If 10 or more digits are entered from either NPA domain 16, 18 the NADP routing domain 20 is accessed. To permit access to other domains using 10 or more digits from within the NPA domains 16, 18, the closest match is always chosen first. Thus, if there is an entry in a gateway table with a prefix of more than 7 digits, that entry will be checked first, followed by any entries with 7 digit prefixes, 6 digit prefixes, etc. Only then is access available using the entries in the gateway table which do not have prefixes, such as an entry for the NADP routing domain from the NPA617 domain 16. When no matches are found in the gateway table, an alias table is checked, as described below.

The second type of translation table is an alias table. The alias table maps addresses in one domain to addresses in another domain with a one-to-one correspondence. As indicated in the example, a range of several address locations can be mapped, but the range may also have a scope of one, e.g., 7321201-7321201. The address codes defining the beginning and end of the range are used to translate an input address into a storage location in another domain. A portion of the alias table for the NPA617 domain 16 is provided below.

| ALIAS TABLE FOR NPA617 | | | |
|---|---|---|---|
| Start of Range | End of Range | Domain | Start Address |
| 7321100 | 7321200 | ABC1 | 100 |
| 7321800 | 7321999 | ABC2 | 201 |

The primary use of aliases is to define groups of voice mailboxes associated with CENTREX lines. Within an area code different companies may have CENTREX phone numbers with the same first three or four digits. Within a CENTREX group, e.g., ABC1, only the last three (or four) digits are dialed to access a telephone or its associated voice mailbox, but to reach the same voice mailbox from the parent domain, e.g., NPA617, all seven digits are required. If a voice mailbox or other application account is outside an originating domain having three digit mailboxes, a three digit number may be used to identify another domain in an alias table. For example, the ABC1 domain 11 may have an alias table identifying a range between 400 and 499 as a range of addresses of voice mailboxes in XYZ Company.

Figure 2:
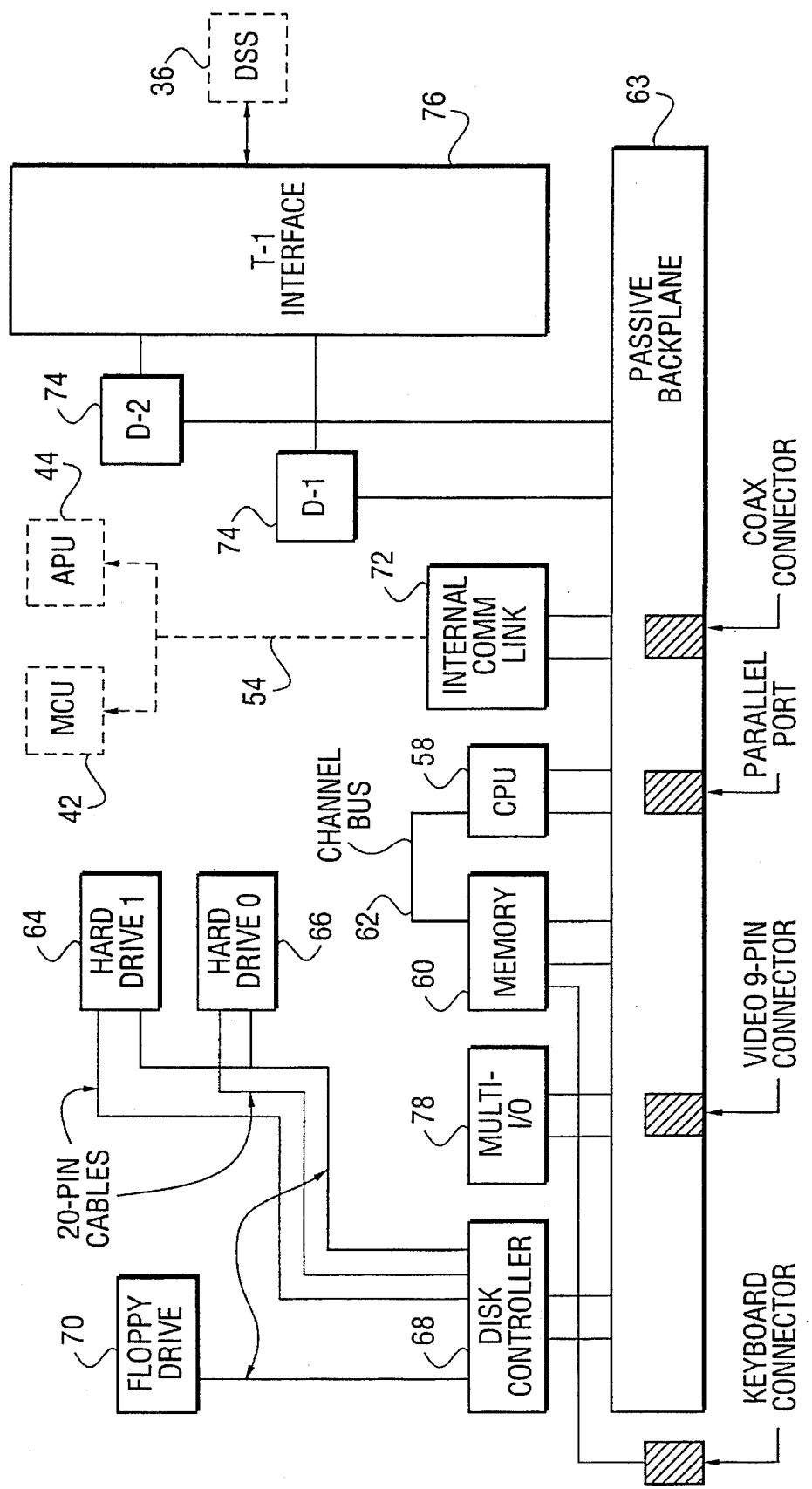
FIG. 2 is a block diagram of a data processing system for providing information services which may use addressing according to the present invention.

A host system according to the present invention may be constructed as illustrated in FIG. 2. Control of the system is provided by a processor (CPU) 58 which is connected via a passive blackplane 63 to hard drives 64, 66 via a disk controller 68. The host system is connected via digital switches 74 and a T-1 interface 76 to a telephone network. The storage locations or voice mailboxes are physically provided by the hard drive units 64, 66 and the translation tables and address tables are also stored on these hard drive units 64, 66. The same tables are stored on each host system, e.g., by copying. The CPU 58 is programmed to provide services to subscribers including identifying a storage location for each input address based on the tables stored in the hard drives 64, 66. The system illustrated in FIG. 2 may be only a single processor system or a locally distributed host system having a plurality of such processor systems, as disclosed in more detail in U.S. Pat. No. 5,029,199 and U.S. patent application Ser. No. 07/594,648.

Figure 3:
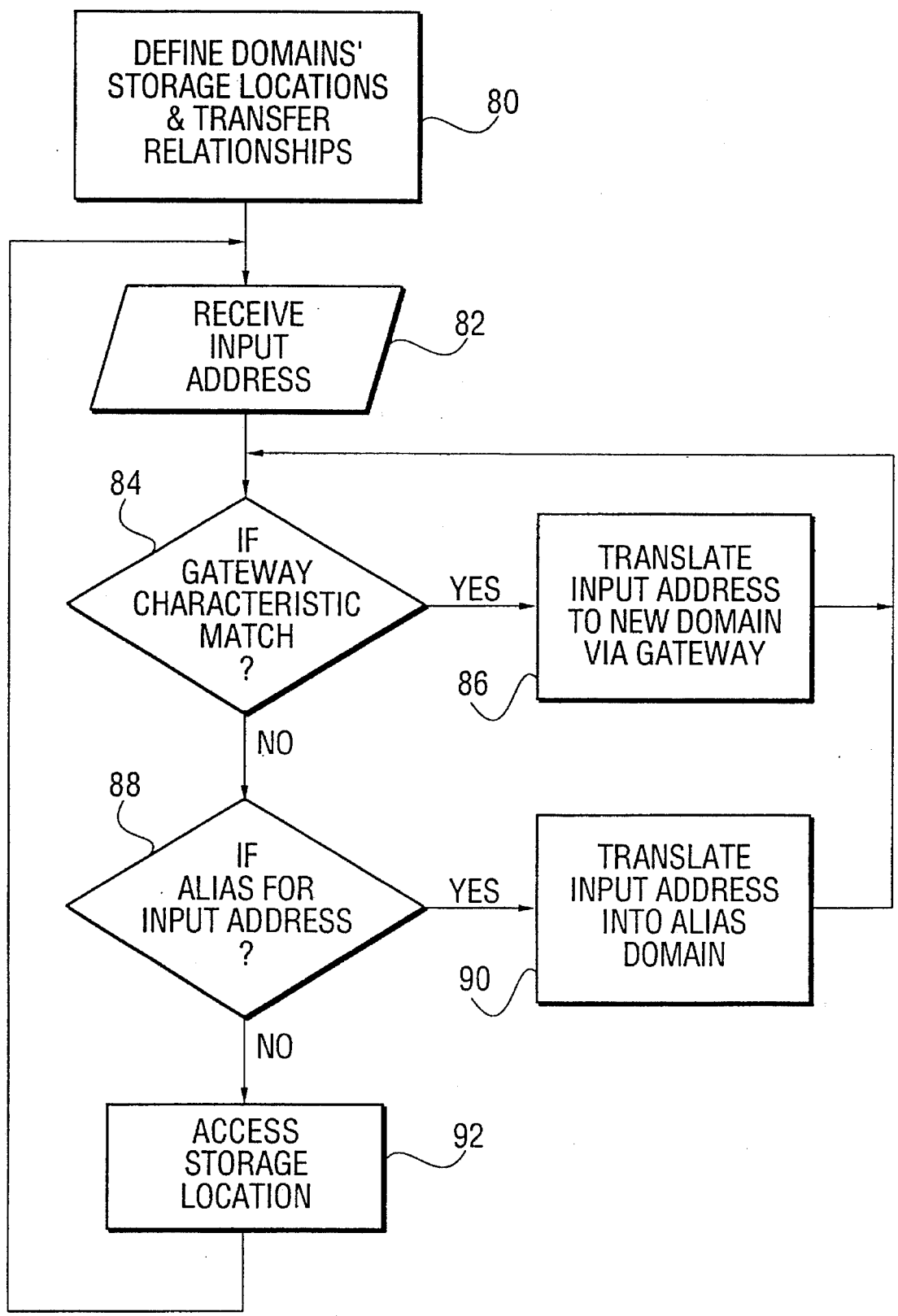
FIG. 3 is a flow chart of a method according to the present invention.

An overview of how the processor 58 in the system illustrated in FIG. 2 is programmed to operate is illustrated in FIG. 3. As described above, the physical manifestation of the domains and the relationships between the domains are defined 80 by storing address, alias and gateway tables. When an input address is received 82, the entries in the gateway table are checked 84, starting with the longest prefixes and ending with the shortest entry containing a number of digits only. If the input address matches 84 the characteristics of one of the entries in the gateway table, the input address is translated 86 into a new domain via the gateway defined in the table. If there is no match 84 of a gateway characteristic, the input address is compared 88 with the entries in the alias table. If the input address fits in one of the ranges defined in the alias table for the originating domain, the input address is translated 90 into an addressed location in an alias domain. In either case, translation then continues in the new domain. The storage location identified by the remainder of the input address, which would be all of the input address if not translated via the alias or gateway tables, is accessed 92 to perform the service requested by the user.

Figure 4:
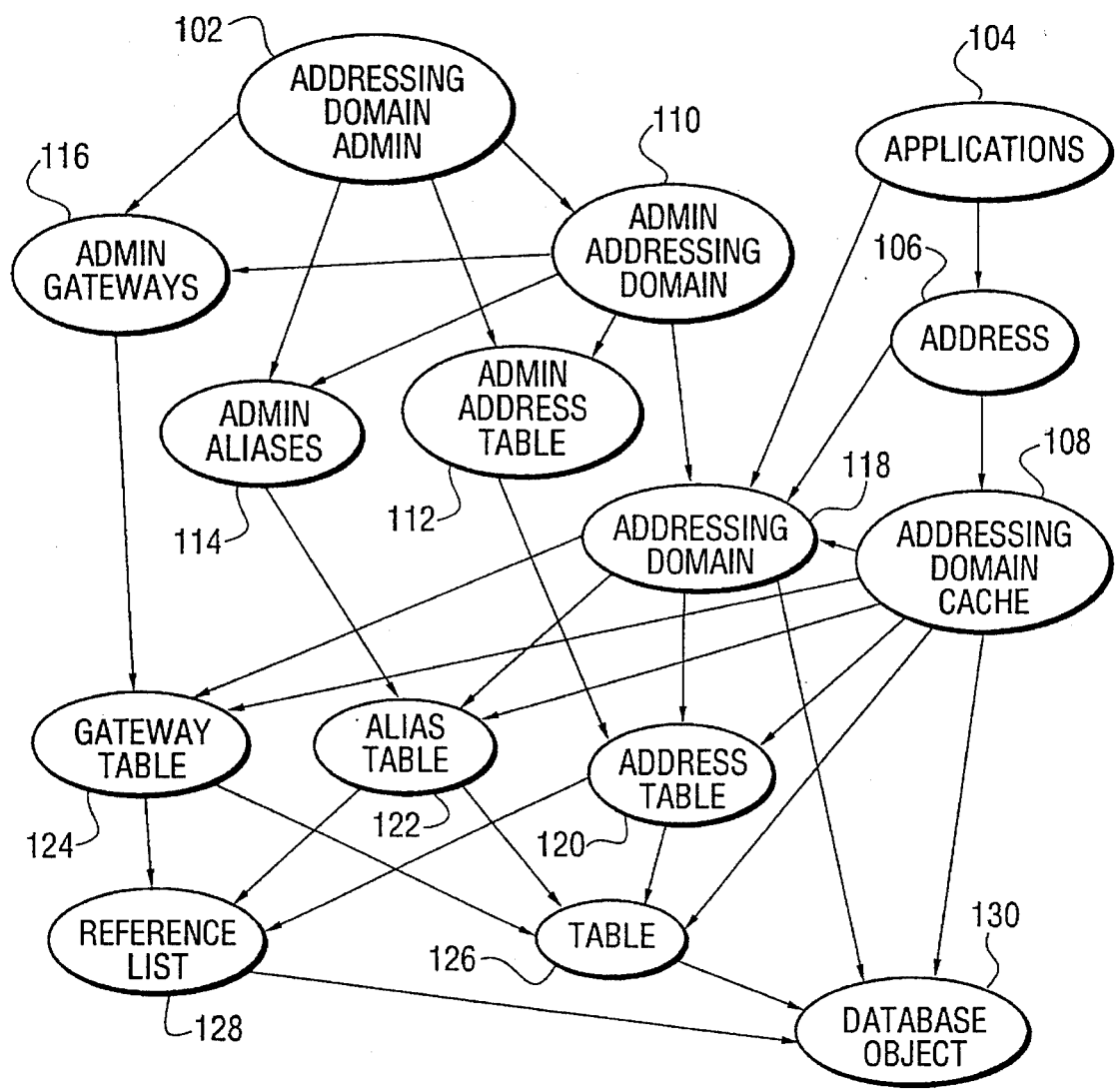
FIG. 4 is a module visibility diagram of software that may be used to implement the present invention.

A more detailed description of the software used in the preferred embodiment will be provided with reference to FIG. 4. A module visibility diagram is illustrated in FIG. 4 for the software executed by the system illustrated in FIG. 2. The microfiche Appendix of the application entitled VOICEMAIL NETWORK AND NETWORKING METHOD, application Ser. No. 07/871,417, filed concurrently herewith and incorporated by reference herein, contains program listings corresponding to the modules illustrated in FIG. 4. Each bubble in the diagram illustrated in FIG. 4 represents a software object, i.e., procedure(s) and data related to each other. The higher level objects are at the top of FIG. 4 and the lower level objects are at the bottom of FIG. 4.

The highest level objects illustrated in FIG. 4 are addressing domain administration program 102 and applications 104. The addressing domain administration program 102 is used to create and maintain the address, alias and gateway tables discussed previously. The corresponding name for the addressing domain administration program is adadmin. The applications object 104 represents all of the applications, i.e., programs, such as voicemail, which use these three tables to locate a mailbox address on a host system. The applications bubble 104 corresponds to any application, such as voicemail, that uses the addressing services to translate and validate account and mailbox numbers.

Underneath the applications bubble 104 are two modules. The address module 106 provides addressing services for any application requiring translating, resolving or validating of a mailbox or account address. The addressing domain cache 108 represents a cache of addressing domain data and the procedures used to access that data. The addressing domain data cache of module 108 is preferably maintained in shared memory by procedures which provide data needed for the operations performed by the address module 106.

The addressing domain administration program 102 is formed of four modules: admin addressing domain 110, admin address table 112, admin aliases 114 and admin gateways 116. These objects include administrative screens and the data accessed by these screens. The procedures in these objects load data from a database, validate input received from an administrator and save the result to the database. The corresponding names in the microfiche appendix of application Ser. No. 07/871,417 are adadom, adaaddr, adaals and adagwy. As indicated in FIG. 4, the admin addressing domain module 110 has access to the screens and data in each of the other three programs at this level, in addition to the direct access of all four modules from the addressing domain administration program 102. The admin addressing domain module 110 also accesses an addressing domain module 118. The addressing domain module 118 represents all addressing domains administrated by the addressing domain administration program 102, including basic configuration information and procedures to create, delete, access and update the addressing domain(s). As illustrated in FIG. 4, some applications, such as voicemail administration, may have direct access to the addressing domain module 118 and in addition, the address program 106 and addressing domain cache module 108 each directly access the addressing domain module 118. In the microfiche appendix of application Ser. No. 07/871,417, the addressing domain module 118 is named adomain.

Software objects for the three tables used in the present invention are represented at the next level. The address table 120, alias table 122 and gateway table 124 represent the component objects of an addressing domain. Each module includes procedures to access and update the respective tables. In the microfiche appendix of application Ser. No. 07/871,417, these modules are named adaddr, adalias and adgtwy.

In the preferred embodiment, the addressing domain cache 108 and the addressing domain module 118 access the address table 120, alias table 122 and gateway table 124 which in turn access lower level objects that perform certain common operations more efficiently. It would be possible for the tables 120, 122, 124 to be the lowest level objects; however, in the preferred embodiment a table program 126 provides common facilities for access to and update of the respective tables which are maintained as part of a table object. In the microfiche appendix of application Ser. No. 07/871,417, the table program 126 is named adtable.

A reference list module 128 maintains a list of referenced objects, in particular addressing domains referred to in the gateway and alias tables. The reference list module 128 maintains a reference count for objects in a database and updates the reference count when references to the object are added or removed from a database. To delete an object from the database, there must be no other objects which refer to that object, i.e., the reference count must be zero. In addition to maintaining addressing domain reference counts, the reference list module 128 may be used as a low level object for other administration objects, such as network accounts, hosts, carriers, etc.

The lowest level object is the database object 130 which maintains the bulk of the data accessed by the application programs 104 and addressing domain administration program 102, as well as other programs, such as network accounts, etc. which are not illustrated in FIG. 4. The database object 130 is capable of performing database operations that are common regardless of object type. The database object 130 may be implemented using a commercially available database manager with custom routines to provide the interface between the other objects illustrated in FIG. 4 and the database manager. Alternatively, the database object 130 may be formed from custom routines and data structures, with or without some commercially available library functions. In the microfiche appendix of application Ser. No. 07/871,417, the database object interface is named dbase.

The correspondence between the modules illustrated in FIG. 4 and the program listings in the microfiche appendix of application Ser. No. 07/871,417 was described above. In addition, the preferred embodiment uses a software product named JAM from JYACC, Inc. of New York, N.Y. to implement the man-machine interface in the higher level programs. JAM provides screen-building and execution flow control.

The many features and advantages of the present invention are apparent from the detailed specification, and thus it is intended by the appended claims to cover all such features and advantages of the system which fall within the true spirit and scope of the invention. Further, numerous modifications and changes will readily occur to those skilled in the art from the disclosure of this invention; thus, it is not desired to limit the invention to the exact construction and operation illustrated and described. Accordingly, suitable modifications and equivalents may be resorted to, as falling within the scope and spirit of the invention.

What is claimed is:

1. A method of addressing in a distributed data processing system including at least two computer systems having storage units and processors and providing information services to subscribers using the storage units and the processors in the at least two computer systems, comprising the steps of:

(a) defining domains of storage locations, including application accounts, in the storage units independent of any physical relationship between the domains and the storage units containing the storage locations;

(b) storing at least one translation table to identify the domains for input addresses;

(c) receiving the input addresses after said storing in step (b); and (d) identifying an addressed location for each of the input addresses by determining an addressed domain and then the addressed location within the addressed domain.

2. A method of addressing in a distributed data processing system including host systems and providing information services to subscribers using storage units and processors in the host systems, each host system including at least one of the storage units and at least one of the processors, said method comprising the steps of:

(a) defining domains, including addressed domains, of storage locations in the storage units independent of any physical relationship between the domains and the storage units containing the storage locations, said defining including the substep of (a1) storing an address table for each one of the domains in at least one of the storage units accessible to each of the processors, the address table defining physical locations of the storage locations within the one of the domains, such that each of the storage locations is defined as located on one of the host systems and one or more of the host systems provides the storage locations within any of the domains;

(b) storing at least one translation table to identify the domains for input addresses:

(c) receiving the input addresses after said storing in step (b); and (d) identifying an addressed location for each of the input addresses by determining one of the addressed domains and then the addressed location within the one of the addressed domains.

3. A method as recited in claim 2, wherein said storing in step (a1) includes storing a range of the storage locations, having a scope of at least one and a host identifier for each entry in the address table, and wherein said defining in step (a) further comprises the step of (a2) copying the address table for each of the domains to all of the host systems.

4. A method as recited in claim 2, further comprising the step of (d) (e) receiving the input addresses to identify the storage locations to be accessed, wherein said storing in step (b) comprises the step of storing in at least one of the storage units entries in an alias table providing one of the at least one translation table for one of the domains, each entry in the alias table defining a one-to-one correspondence between a range of address codes and a range of the storage locations in one of the addressed domains, each of the ranges of the address codes and the storage locations having a scope of at least one, and wherein said identifying in step (d) comprises the steps of:

(d1) comparing the input addresses with the address codes in the alias table for the one of the domains; and (d2) identifying the addressed location as one of the storage locations having a one-to-one correspondence with an identified address code in the range of address codes in one of the entries of the alias table if the identified address code matches one of the input addresses.

5. A method as recited in claim 2, further comprising the step of (e) receiving the input addresses to identify the storage locations to be accessed, wherein said storing in step (b) comprises the step of storing, in at least one of the storage units, entries in a gateway table providing one of the at least one translation table for one of the domains, each entry defining a relationship between characteristics of the input addresses and a corresponding addressed domain, and wherein said identifying in step (d) comprises the steps of:

(d1) comparing the input addresses with each entry in the gateway table; and (d2) identifying the addressed location as within the corresponding addressed domain in one of the entries in the gateway table for each of the input addresses having a match with the characteristics in the one of the entries.

6. A method as recited in claim 5, wherein said storing in step (b) comprises the step of (b1) storing prefixes corresponding to an initial part of the input addresses as one of the characteristics, and wherein said identifying in step (d) identifies the addressed location as within the corresponding addressed domain if one of the prefixes matches the initial part of one of the input addresses.

7. A method as recited in claim 6, wherein said storing in step (b) further comprises the step of (b2) storing a number of digits as another of the characteristics, and wherein said identifying in step (d2) identifies the addressed location as within the corresponding addressed domain if the number of digits in the one of the entries equals the number of digits in one of the input addresses and none other of the entries provide a closer match to the one of the input addresses.

8. A method as recited in claim 7, wherein each of the entries in the gateway table includes space for both the prefixes and the number of digits, and wherein said comparing in step (d1) compares each of the input addresses with both the prefixes and the number of digits in the entries for the entries having both and with only one of the prefixes and the number digits for the entries otherwise.

9. A method as recited in claim 5, wherein said storing in step (b) comprises the step of storing a number of digits as one of the characteristics, and wherein said identifying in step (d2) identifies the addressed location as within the corresponding addressed domain if the number of digits in the one of the entries equals the number of digits in one of the input addresses and none other of the entries provide a closer match to the one of the input addresses.

10. A method of operating information services for subscribers, the information services provided by host systems having processors and storage units containing storage locations, with at least one kilometer separating at least two of the host systems, the subscribers accessing the host systems via a telephone system, said method comprising the steps of:

(a) assigning at least one domain for each of the subscribers, resulting in a plurality of domains being assigned, each domain having a unique name within the telephone system;

(b) storing for each domain:

(b1) an address table having entries, each entry containing an identifier of one of the host systems, a first range of the storage locations provided by the one of the host systems and a second range of addresses within the domain of the address table, corresponding to the first range of the storage locations, the first and second ranges each having a scope of at least one:

(b2) an alias table having entries, each entry containing a first name of an alias domain, a third range of the addresses in the alias domain and a fourth range of address codes in the domain of the alias table, the third and fourth ranges having a one-to-one correspondence and each having a scope of at least one: and (b3) a gateway table having entries, each entry containing a second name of an alternate domain and at least one of a prefix and a number of digits:

(c) receiving an input address from a user of the telephone system currently assigned an originating domain;

(d) translating the input address into a first storage location corresponding to an alias address in the address table for the alias domain if the input address contains one of the address codes in the fourth range in one of the entries in the alias table;

(e) translating the input address into a second storage location corresponding to an alternate domain address in the address table for the alternate domain if the input address does not include the address codes in the fourth range in any of the entries in the alias table and one of the entries in the gateway table is a closer match to the input address than any other entry in the gateway table;

(f) identifying a third storage location corresponding to the input address using the address table for the originating domain if said translating in steps (d) and (e) is not performed: and (g) accessing one of the first, second and third storage locations in dependence upon which of steps (d), (e) and (f) was performed.

11. A method as recited in claim 10, wherein the storage locations include voice mail boxes, and wherein said method further comprises the steps of copying the address, alias and gateway tables for each domain for access by all of the host systems in the telephone system and in any other telephone system having access to the voice mail boxes via the host systems.

* * * * *